UNITED STATES PATENT OFFICE.

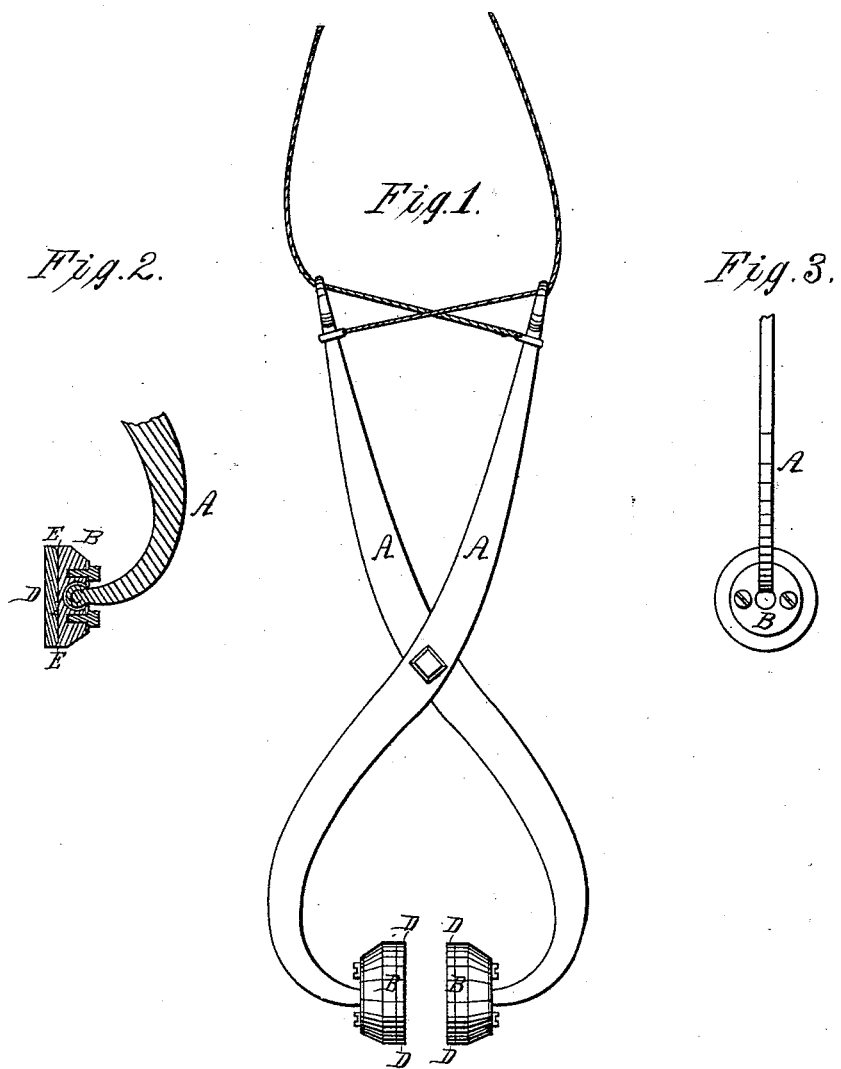

WILLIAM C. FREDERICK, OF MEDFORD, MASS., ASSIGNOR TO WILLIAM HENRY HOOPER AND WILLIAM A. WILLARD, OF SAME PLACE.

IMPROVEMENT IN HOISTING-TONGS.

Specification forming part of Letters Patent No. 166,599, dated August 10, 1875; application filed February 12, 1875.

*To all whom it may concern:*

Be it known that I, WILLIAM CROOKER FREDERICK, of Medford, in the county of Middlesex and State of Massachusetts, have invented an Improvement in Hoisting-Tongs; and I do hereby declare that the following, taken in connection with the drawings which accompany and form part of this specification, is a description of my invention sufficient to enable those skilled in the art to practice it.

The nature of my invention consists in providing a pair of tongs to hoist stone and other heavy bodies, where there are no edges to take hold of, or where the sides are smooth and likely to be damaged by using a chain, or where the sides are not parallel to each other, and where a hole for a lewis cannot be made without damage to the stone. It is also designed to save labor and time in drilling a hole for a lewis, or adjusting a chain around the stone or body to be raised.

The accompanying drawing represents a pair of tongs embodying my invention.

Figure 1 shows a plan of the tongs; Fig. 2, a section of one of the clamps with the socket-joint and the filling; Fig. 3, an elevation of one of the clamps.

A A are the tongs. They are made in the same manner as common shears, with their parts below the rivet bent toward each other, and a ball on the end, as shown in Figs. 1 and 2. B B are the clamps, made with socket to fit the ball on the end of the tongs, which forms the socket-joint, as shown in Fig. 2, and allows the clamp to revolve and conform to any angle that the side of the body may have which it is desired to raise. The clamp is held onto the tongs by a piece fitted loosely around them just above the ball, and fastened to the clamp with screws, as shown in Fig. 3. D D D D is the filling, made of soft metal, wood, or rubber. It is kept in its place by the flanges E E, as shown in Fig. 2.

I claim—

The tongs A A, carrying upon their bent prongs balls c, in combination with the clamps B B, having sockets to receive the balls c, filling D, of soft metal or equivalent material, and flange E, the whole constructed as shown and described, for the purpose specified.

WILLIAM CROOKER FREDERICK.

Witnesses:
GEO. HILL,
FRANK B. SMITH.